United States Patent [19]

Malinowski

[11] Patent Number: 6,044,441
[45] Date of Patent: Mar. 28, 2000

[54] METHOD AND APPARATUS FOR ENCODING VALID AND INVALID STATES IN A CACHE WITH AN INVALID PATTERN

[75] Inventor: Richard Malinowski, Placerville, Calif.

[73] Assignee: Intel Corporation, Santa Clara, Calif.

[21] Appl. No.: 08/979,276

[22] Filed: Nov. 26, 1997

Related U.S. Application Data

[63] Continuation of application No. 08/536,110, Sep. 29, 1995, abandoned.

[51] Int. Cl.[7] .................................................. G06F 12/00
[52] U.S. Cl. ......................... 711/144; 711/145; 711/154; 711/156; 711/3
[58] Field of Search .................................... 711/144, 145, 711/138, 139, 154, 156, 118, 3

[56] References Cited

U.S. PATENT DOCUMENTS

| | | | |
|---|---|---|---|
| 4,197,580 | 4/1980 | Chang et al. | 711/144 |
| 4,638,431 | 1/1987 | Nishimura | 711/144 |
| 4,912,632 | 3/1990 | Gach et al. | 710/28 |
| 5,210,847 | 5/1993 | Thome et al. | 711/138 |
| 5,553,263 | 9/1996 | Kalish et al. | 711/127 |
| 5,625,793 | 4/1997 | Mirza | 711/138 |
| 5,666,482 | 9/1997 | McClure | 714/8 |
| 5,761,719 | 6/1998 | Mahin et al. | 711/139 |
| 5,822,762 | 10/1998 | Nishida et al. | 711/139 |
| 5,960,456 | 9/1999 | Herbst | 711/141 |

*Primary Examiner*—Eddie P. Chan
*Assistant Examiner*—Hong Kim
*Attorney, Agent, or Firm*—Blakely, Sokoloff, Taylor & Zafman LLP

[57] ABSTRACT

A cache controller unit includes an address comparator unit for comparing an address to be accessed in memory with a tag address. An invalid pattern comparator is coupled to the address comparator. The invalid pattern comparator operates to compare the tag address with an invalid pattern. A qualifier unit is coupled to the address comparator and the invalid pattern comparator. The qualifier unit outputs a signal when the address to be accessed in the memory matches the tag address in the address tag and the address tag does not match the invalid pattern.

8 Claims, 6 Drawing Sheets

METHOD AND APPARATUS FOR ENCODING VALID AND INVALID STATES IN A CACHE WITH AN INVALID PATTERN

This is a continuation of application Ser. No. 08/536,110, filed on Sep. 29, 1995, now abandoned.

FIELD OF THE INVENTION

The present invention relates to a cache memory system. More specifically, the present invention relates to an apparatus and method for indicating whether data stored in a cache memory location is valid or invalid.

BACKGROUND OF THE INVENTION

A cache memory is a high-speed memory which speeds up CPU memory accesses by storing certain sections of the main memory. The cache memory responds to CPU memory cycles when CPU memory cycles are directed towards locations previously stored in the cache. Caches are in a level of the memory hierarchy between the CPU and main memory and takes advantage of its locality of access. Cache memory typically comprises dynamic random access memory (DRAM), static random access memory (SRAM), or other memory devices. Data stored in a cache memory is organized into data sets which are commonly referred to as cache lines or data lines.

Restrictions on where a block of data is placed in a cache create three categories of cache organization. If each block of data has only one place it can appear in the cache, the cache is said to be direct mapped. The mapping is usually the block-frame address modulo the number of blocks in the cache. If a block of data can be placed anywhere in the cache, the cache is said to be fully associative. If a block of data can be placed in a restrictive set of places in the cache, the cache is said to be set associative. A set is a group of two or more blocks in the cache. The block of data is first mapped onto a set. Then, the block of data can be placed anywhere within the set. The set is usually chosen by bit selection such as block-frame address modulo the number of sets in the cache. If there are n blocks in a set, the cache placement is called n-way set associative.

Cache designs typically require tag random access memory (RAM) to record information specifying which memory sections are stored within the cache. Usually, only a certain portion of the address is stored within the tag RAM. A tag entry called a tag address is compared against the corresponding address portion of the current memory cycle in order to determine whether a match occurred. This process is, called a cache look-up. The tag address of every cache block that might contain the desired information is checked to see if it matches the block-frame address from the CPU. All possible tags are typically searched in parallel since speed is of the essence.

When a cache look-up is successful a cache hit occurs. Certain cache implementations require another tag entry called a valid bit. A valid bit qualifies a cache look-up such that a cache hit occurs only when the valid bit is set. The valid bit is typically added to the address tag to indicate whether or not a specific entry contains a valid address. There are several instances where the address tag may represent an invalid address. For example, when a processor starts up, the cache is empty. Thus, the tag address fields corresponding to cache locations are invalid. Another example of an instance where an address tag may represent an invalid address is when memory is updated with new data. In this situation, the corresponding cache locations containing outdated information should not be accessed despite the fact that the tag address corresponds to an area of memory. In these instances, the cache controller needs to be informed that the specific cache location is not valid, although previously cached to avoid cache coherency problems. Thus implementation of a valid bit indicates whether an entry contains a valid address. If the bit is not set, the cache controller realizes no hit can occur on this address.

The traditional way of implementing a valid tag entry is the allocation of one tag RAM bit for each cache location. The allocated bit defines whether the cache location is in a valid or invalid state. The penalty that a system designer pays for the valid/invalid state in the traditional approach is the fact that the tag RAM needs to be one bit wider for a given cacheability range.

Thus, a more efficient apparatus and method for indicating whether data stored in a cache memory location is valid is needed.

SUMMARY OF THE INVENTION

A method and apparatus for determining whether data stored in cache memory location is valid is disclosed. One embodiment of a cache controller, according to the present invention, comprises an address comparator unit for comparing an address to be accessed in memory with a tag address. An invalid pattern comparator is coupled to the address comparator for comparing the tag address with the invalid pattern. A qualifier unit is coupled to the address comparator and the invalid pattern comparator. The qualifier unit outputs a signal when the address to be accessed in the memory matches the tag address and the address tag does not match the invalid pattern.

One embodiment of a tag RAM having a width of N-bits, according to the present invention, comprises an N-bit line for storing a tag entry and for indicating when invalid data is stored in a cache memory, wherein all N bits of the N-bit line can be used for recording a tag address.

Another embodiment of the present invention discloses a method for indicating whether data stored in a cache memory location is valid. There are two cases of indicating a state of a cache line, making the cache line state valid and making the cache line state invalid. A cache line state is validated by storing a valid pattern into the tag RAM when the cache is filled with new data. A cache line state is invalidated when the memory is updated with new data. First, determine whether a location in memory has been updated. Next, determine whether an address of said location in the memory is stored in a location in a tag RAM. If the location in memory has been updated and the address of the location in memory is stored in a location in the tag RAM, overwrite the location in said tag RAM with an invalid pattern.

Another embodiment of the present invention discloses a method for determining whether data stored in a cache memory is valid. First, determine whether a memory address matches a tag address stored in a tag RAM. Next, determining whether the tag address stored in the tag RAM matches an invalid pattern.

BRIEF DESCRIPTION OF THE DRAWINGS

The present invention will be understood more fully from the detailed description given below and the accompanied drawings of the various features and elements embodied in the invention. The description and drawings are not meant to limit the invention to the specific embodiment. They are provided for explanation and understanding.

DETAILED DESCRIPTION

An apparatus and method for indicating whether data stored in a cache memory location is valid or invalid is disclosed. In the following detailed description, numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Figure 1:
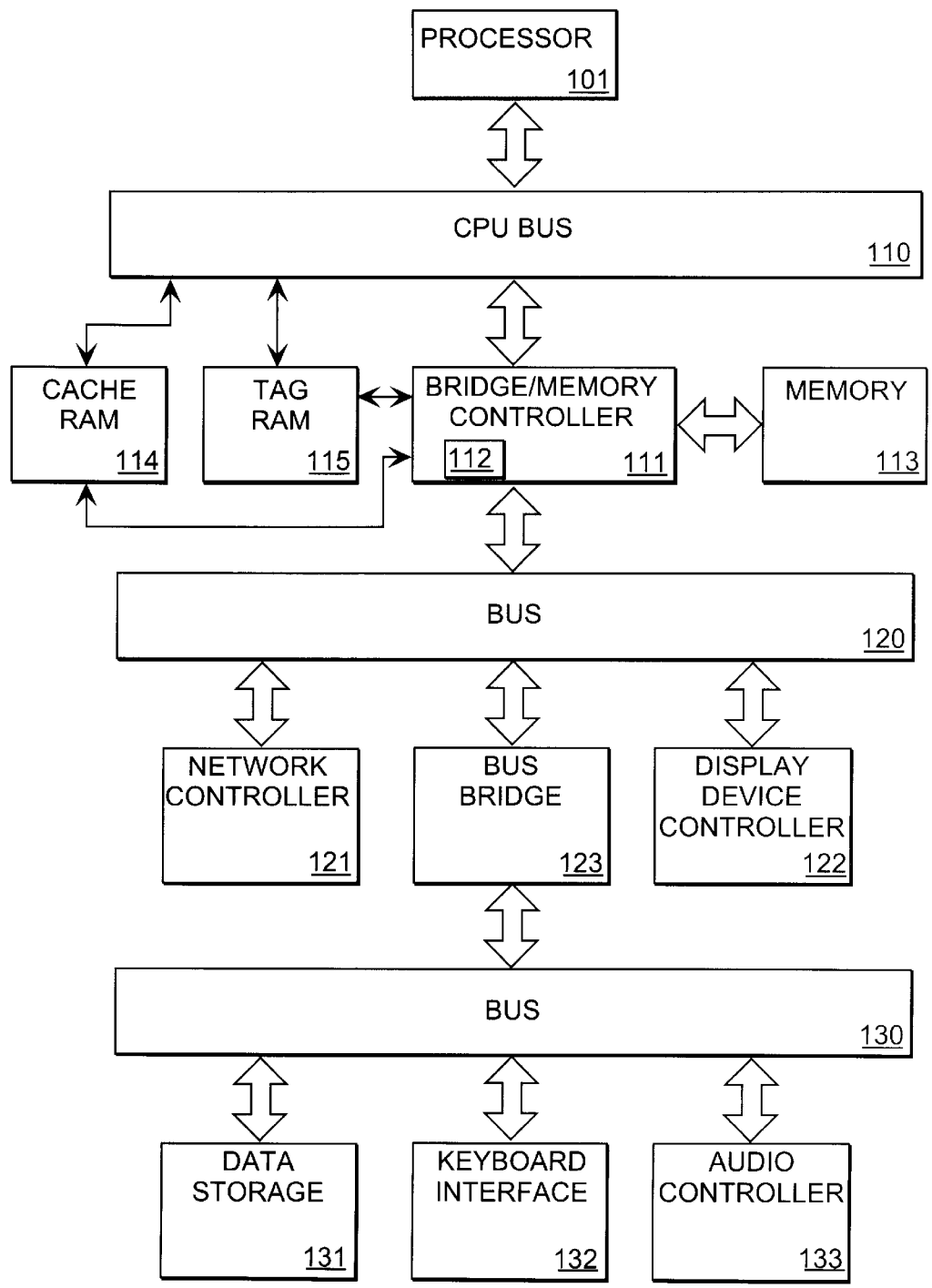
FIG. 1 illustrates an embodiment of the present invention as implemented in a computer system.

FIG. 1 illustrates in block diagram form a computer system of one embodiment of the present invention. The computer system comprises processor 101 for processing digital data. Processor 101 can be a complex instruction set computing (CISC) microprocessor, a reduced instruction set computing (RISC) microprocessor, a very long instruction word (VLIW) microprocessor or other processor device. Processor 101 is coupled to CPU bus 110 which transmits signals between processor 101 and other components in the computer system. Memory 113 is coupled to CPU bus 110 and comprises a dynamic random access memory (DRAM) device, a static random access memory (SRAM) device, or other memory devices. Memory 113 stores information or other intermediate data during execution by processor 101. Bridge memory controller 111 is coupled to CPU bus 110 and memory 113. Bridge memory controller 111 directs data traffic between processor 101, memory 113, and other components in the computer system and bridges signal from these components to high speed I/O bus 120.

I/O bus 120 supports peripherals operating at high data throughput rates. Bus 120 can be a single bus or a combination of multiple buses. As an example, bus 120 can comprise a Peripheral Components Interconnect (PCI) bus, a Personal Computer Memory Card International Association (PCMCIA) bus, a VL bus or other buses. Bus 120 provides communication links between components in the computer system. Network controller 121 links a network of computers together and provides communication among the machines. Display device controller 122 is coupled to high speed I/O bus 120. Display device controller 122 allows coupling of a display device to the computer system and acts as an interface between the display device and the computer system. Display device controller 122 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from processor 101 through display device controller 122 and displays the information and data to the user of the computer system.

I/O bus 130 is used for communicating information between peripheral device which operate at lower throughput rates. I/O bus 130 can be a single bus or a combination of multiple buses. As an example, bus 130 can comprise an Industry Standard Architecture (ISA) bus, an Extended Industry Standard Architecture (EISA) bus or a Micro Channel Architecture (MCA) bus. Bus 130 provides communication links between components in the computer system. Keyboard interface 132 can be a keyboard controller or other keyboard interface. Keyboard interface 132 can be a dedicated device or can reside in another device such as a bus controller or other controller. Keyboard interface 132 allows coupling of a keyboard to the computer system and transmits signals from a keyboard to the computer system. Mass storage device 131 can be a hard disk drive, a floppy disk drive, a CD-ROM device, a flash memory device or other mass storage device. Mass storage device 131 provides information and data to external memory 113. Audio controller 133 operates to coordinate the recording and playing of sounds is also coupled to I/O bus 130. Bus bridge 123 couples bus 120 to bus 130. Bus bridge 123 comprises a translator to bridge signals between bus 120 and 130.

Cache RAM 114 is coupled to CPU bus 110 and comprises a DRAM, SRAM, or other memory devices. Cache RAM 114 is a fast access memory that stores data reflecting selected locations in memory 113. Data written into memory 113 from CPU bus 110 is also written into cache RAM 114 from CPU bus 110. Cache RAM 114 may be a direct mapped cache, a fully associative cache or a set associative cache. Tag RAM 115 is coupled to CPU bus 110 and comprises DRAM, SRAM, or other memory devices having a plurality of lines for storing data. Each of the lines in tag RAM 115 correspond to a location in cache RAM 114. Tag RAM 115 operates to record information specifying which memory sections are stored within cache RAM 114. Tag RAM 115 receives information specifying the address locations in memory 113 which are stored in cache RAM 114 from CPU bus 110. Tag RAM 115 has a width of N bits per line. In this embodiment of the present invention, all N bits of a line in tag RAM 115 are used to store tag addresses. The number of bits available for storing a tag address determines the total cacheability of cache RAM 114. Thus, since all N bits of N-bit wide tag RAM 115 are used to store a tag address, the total cacheability of cache RAM 114 is $2^N$ multiplied by the cache RAM size.

Bridge memory controller 111 is coupled to cache RAM 114 and tag RAM 115. Bridge memory controller 111 operates to interface processor 101 with cache RAM 114. Bridge memory controller 111 overwrites a N-bit tag address in tag RAM 115 with a N-bit predefined invalid pattern when the data in cache RAM 114 corresponding to that tag address becomes invalid. The N-bit invalid pattern is used to mark an invalid address instead of an invalid bit. This allows the bit in the tag RAM that is typically reserved as an invalid bit to be used in the tag address field. As a result, the cacheability range determined by tag RAM 115 is extended from $2^{(N-1)}$ multiplied by the cache RAM size to $2^N$ multiplied by the cache RAM size.

Bridge memory controller 111 comprises cache controller 112. Cache controller 112 determines when cache RAM 114 contains a valid address and should be accessed by processor 101 instead of memory 113. Cache controller 112 compares the memory address requested by processor 101 with the tag addresses stored in tag RAM 115 to determine whether cache RAM 114 is currently storing data requested by processor 101. Cache controller 112 also compares the tag addresses stored in tag RAM 115 with a predefined invalid pattern. If the tag address matches the invalid pattern, the cache controller 112 issues a cache miss. If the memory address requested by processor 101 matches a tag address stored in tag RAM 115 and the tag address does not match the invalid pattern, a cache hit is issued.

Figure 2:
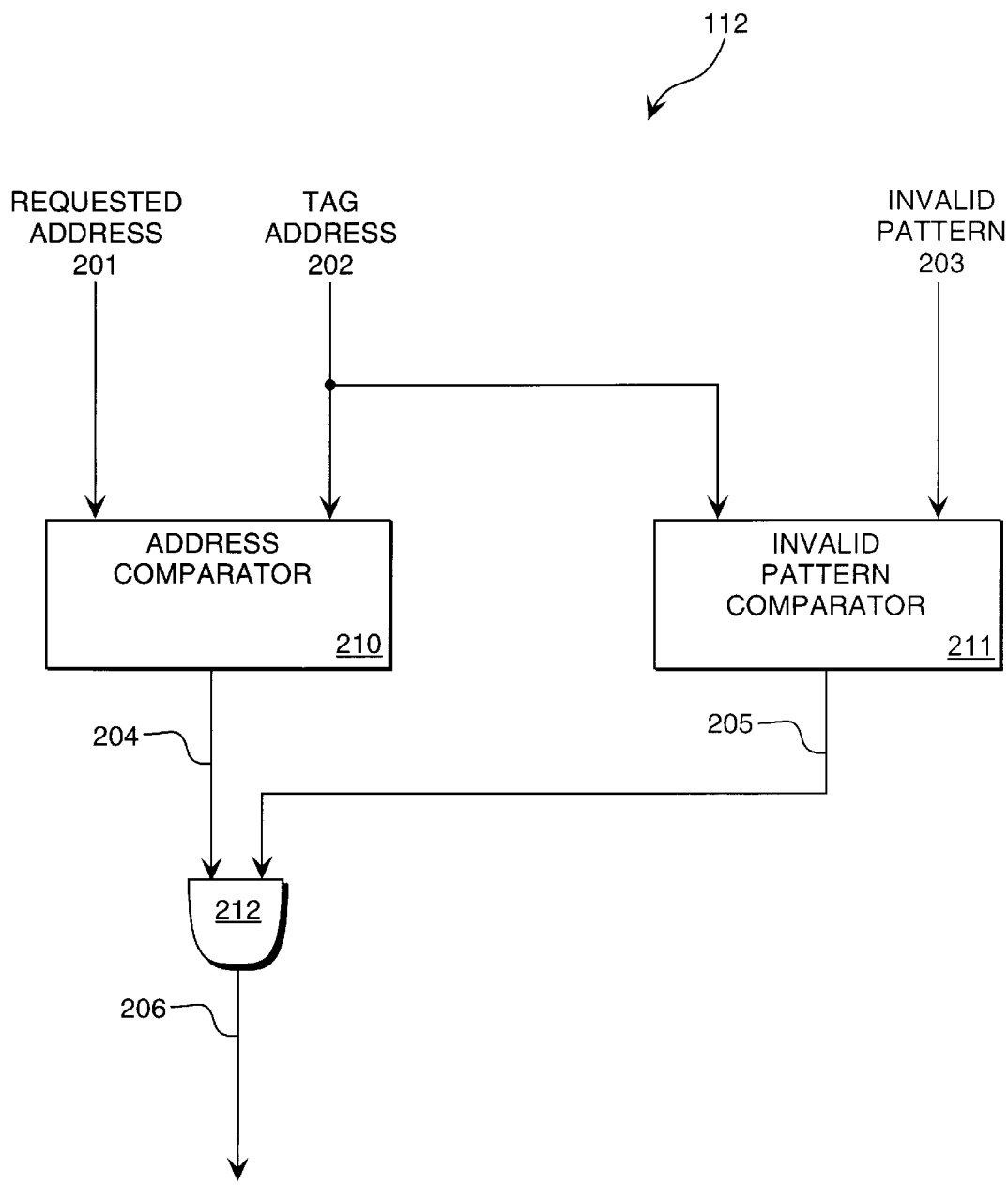
FIG. 2 illustrates a block diagram of an embodiment of the present invention.

FIG. 2 illustrates a block diagram of one embodiment of a cache controller according to the present invention. Cache controller 112 comprises address comparator 210, invalid pattern comparator 211, and qualifier unit 212. Address comparator is coupled to qualifier unit 212 and operates to compare a memory address requested by processor 101 with tag addresses stored in tag RAM 115. Address comparator receives a memory address requested by processor 101 from line 201. Address comparator receives tag addresses stored in tag RAM 115 from line 202. Address comparator 210 outputs a signal on line 204 when there is match between a memory address requested by processor 101 and a tag address stored in tag RAM 115.

Invalid pattern comparator 211 is coupled to qualifier unit 212 and operates to compare a tag address stored in tag RAM 115 with a predefined invalid pattern. Invalid pattern comparator 211 receives tag addresses stored in tag RAM 115 from line 202. Invalid pattern comparator 211 receives a predefined invalid pattern form line 203. Invalid pattern comparator 211 outputs a signal on line 205 when there is no match between the tag address received from line 202 and the invalid pattern received from line 203.

Qualifier unit 212 is coupled to address comparator 210 and invalid pattern comparator 211 and operates to output a signal on line 206 when it receives a signal on line 204 and on line 205. The signal output on line 206 indicates a cache hit. The cache hit signal instructs cache RAM 114 to send data stored in the location corresponding to the tag address on line 202 to processor 101. Qualifier unit 212 outputs no signal on line 206 when there is a cache miss. This occurs either when the memory address requested by processor 101 is not stored in tag RAM 115 or when the tag RAM address matches an invalid pattern. In the preferred embodiment of the present invention, qualifier unit 212 is a logic gate performing an AND logic function. Qualifier unit 212 may also be implemented by any other known logic circuitry.

Figure 3:
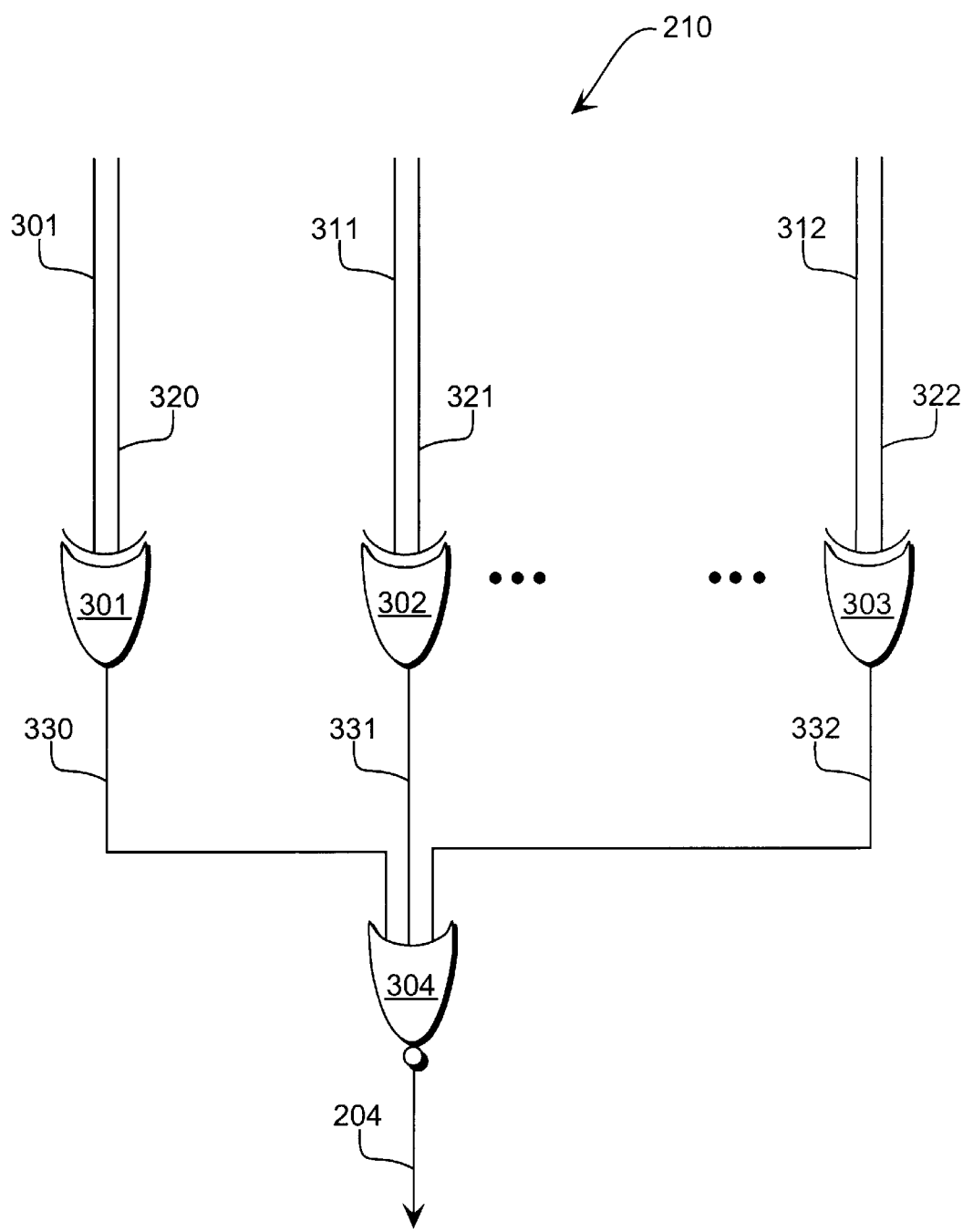
FIG. 3 illustrates one embodiment of an address comparator according to an embodiment of the present invention.

FIG. 3 illustrates one embodiment of address comparator 210 as implemented by logic gates. Address comparator 210 comprises a plurality of XOR gates 301, 302, and 303 and a NOR gate 304. Each of the plurality of XOR gates 301, 302, and 303 receives a bit from a memory address requested by processor 101 and a bit from a tag address from tag RAM 115. XOR gate 301 receives a first bit of a memory address requested by processor 101 on line 310 and a first bit of a tag address from tag RAM 115 on line 320. XOR gate 302 receives a second bit of a memory address requested by processor 101 on line 311 and a second bit of a tag address from tag RAM 115 on line 321. XOR gate 303 receives a last bit of a memory address requested by processor 101 on line 312 and a last bit of a tag address from tag RAM 115 on line 322. XOR gates 301, 302, and 303 output high signals on lines 330, 331, and 332 when there is a mismatch between any of the bits of the memory address requested by processor 101 and the tag address from tag RAM 115. XOR gates 301, 302, and 303 output low signals on lines 330, 331, and 332 when there is a match between the bits of the memory address requested by processor 101 and the tag address from tag RAM 115. Lines 330, 331, and 332 is coupled to the input of NOR gate 304. NOR gate 304 outputs a high signal on line 204 when all the bits of the memory address requested by processor 101 and the tag address from tag RAM 115 match. NOR gate 304 outputs a low signal on line 204 when there is mismatch between any of the bits. Address comparator 210 may also be implemented by any other known logic circuit.

Figure 4:
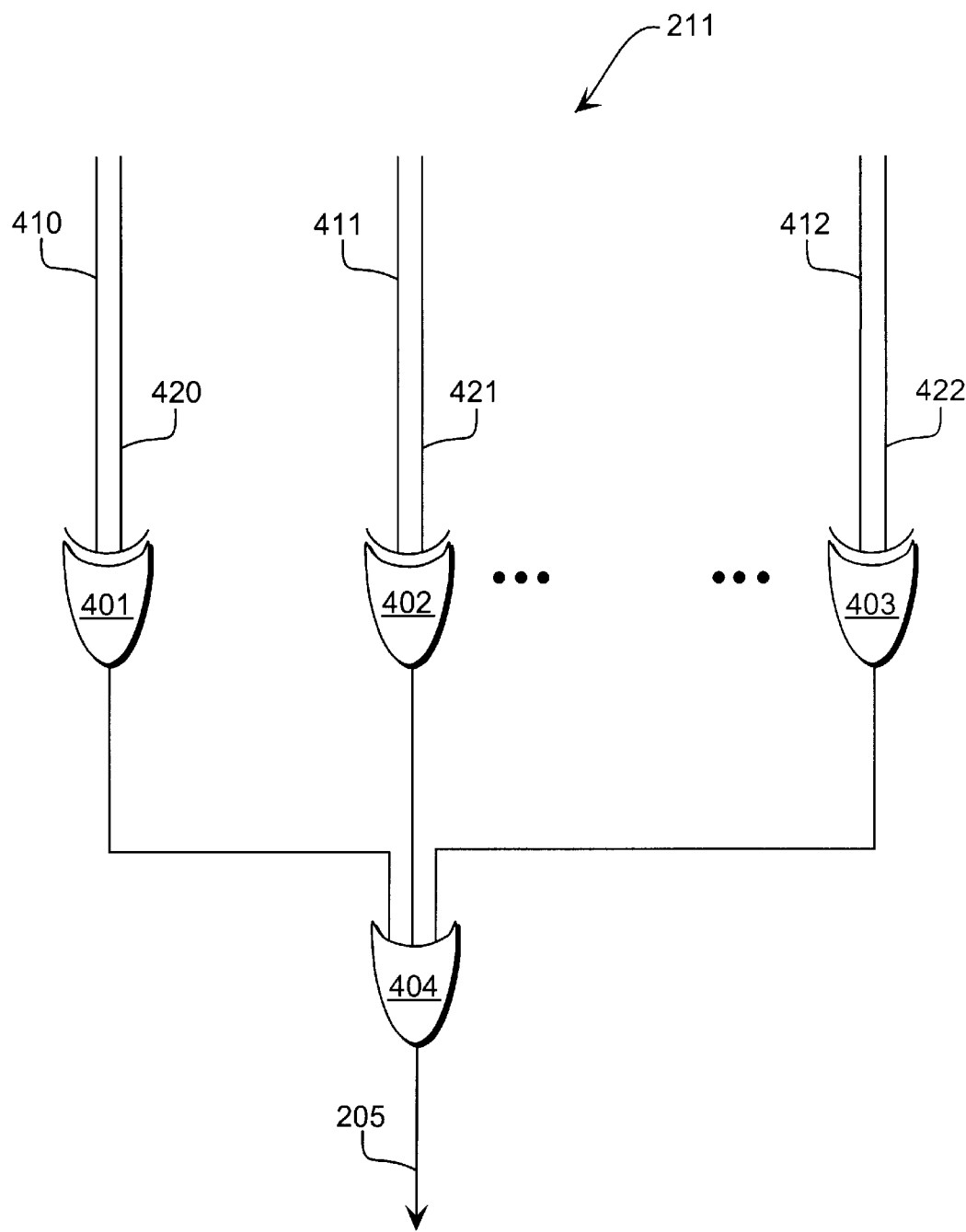
FIG. 4 illustrates one embodiment of an invalid pattern comparator according to an embodiment of the present invention.

FIG. 4 illustrates one embodiment of invalid pattern comparator 211 as implemented by logic gates. Invalid pattern comparator 211 comprises a plurality of XOR gates 401, 402, and 403 and a OR gate 404. Each of the plurality of XOR gates 401, 402, and 403 receives a bit from a tag address retrieved from tag RAM 115 and a bit from a predefined invalid pattern from bridge memory controller 111. XOR gate 401 receives a first bit of a tag address retrieved from tag RAM 115 on line 410 and a first bit of an invalid pattern tag on line 420. XOR gate 402 receives a second bit of a tag address retrieved from tag RAM 115 on line 411 and a second bit of an invalid pattern on line 421. XOR gate 403 receives a last bit of a tag address retrieved from tag RAM 115 on line 412 and a last bit of an invalid bit on line 422. XOR gates 401, 402, and 403 output high signals on lines 430, 431, and 432 when there is a mismatch between any of the bits of the tag RAM address retrieved from tag RAM 115 and the invalid pattern. XOR gates 401, 402, and 403 output low signals on lines 430, 431, and 432 when there is a match between the bits of the tag address retrieved from tag RAM 115 and the invalid pattern. Lines 430, 431, and 432 is coupled to the input of OR gate 404. OR gate 404 outputs a high signal on line 205 when any of the bits of the tag address retrieved from tag RAM 115 and the invalid patterns do not match. OR gate 304 outputs a low signal on line 205 when there is match between all the bits of the tag address and the invalid pattern. Invalid pattern comparator 211 may also be implemented by any other known logic circuit.

Cache controller 112 does not cache all possible tag address combinations. Instead, cache controller 112 excludes one entry and uses it as an indicator for indicating that an address tag is invalid. All other tag entry values not matching this encoding define the cache line state to be valid. Any specific pattern can be chosen for the invalid tag entry. The pattern can be tailored towards specific implementation requirements. In one embodiment of the present invention, the pattern of all 1's is designated as being an invalid entry. By eliminating the use of a valid bit, the space normally reserved for a valid bit can be used as an extension of the tag address, thus doubling the cacheability range of the system. Alternatively, the savings incurred by eliminating the need of a valid bit can be applied to reducing hardware costs in the system. Thus, the present invention may either be used to raise system performance without increasing cost or lower the overall system cost without sacrificing performance.

The penalty of excluding the cacheability of one entry for the use of an invalid pattern is minimal compared to the benefits incurred from implementing this technique. Cacheability is determined by $$tc = 2^N * (\text{Cache Size})$$

Total cacheability, tc, is calculated by taking 2 to the Nth power and multiplying this value with the cache size. Where N is the number of bits in the tag RAM designated for the tag address field. Thus, for example, an 8 bit wide tag RAM implementing the present invention in a 256 KB cache system increases its cacheability from 32 MB to 64 MB, as compared to a 7-bit address tag with a 1-bit valid entry.

The penalty incurred for excluding the cacheability of one entry is equal to the cache size. Thus, for example, an 8 bit wide tag RAM having a 256 K cache implementing this invention incurs a degradation of 256 KB. The penalty of 256 KB is minimal compared to the increase of cacheability of 32 MB.

There are two cases of indicating a state of a cache line, making the cache line state valid and making the cache line state invalid. A cache line state is validated by storing a valid pattern into the tag RAM when the cache is filled with new data. A cache line state is invalidated when the memory is updated with new data. A method for cache validation using the present invention comprises the steps of first determining whether the cache has been filled with new data. If the cache has not been filled with new data, continue to check the status of the cache. If the cache has been filled with new data, overwrite the address in the tag RAM with a valid pattern.

Figure 5:
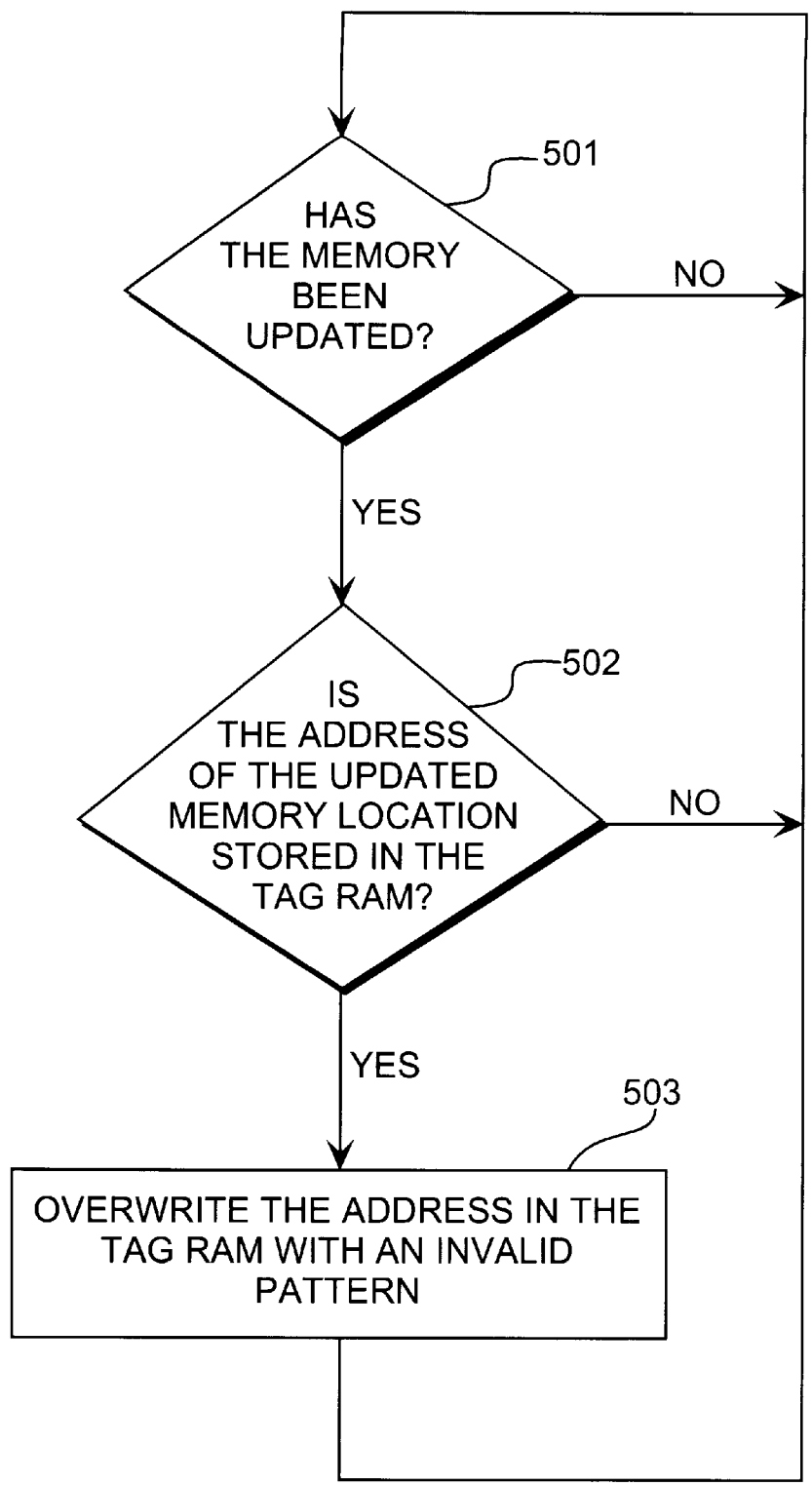
FIG. 5 is a flow chart illustrating a method for indicating whether data stored in a cache memory location is valid.

FIG. 5 is a flow chart illustrating a method for cache invalidation. First, determine whether data in the memory has been changed, as shown in block 501. This can be achieved by having a bridge memory controller detect when the memory has been written with data by a device on an I/O bus transferring data to memory. The memory may be overwritten with new data from a peripheral device on an I/O bus for example. If the memory has not been overwritten with new data, go to block 501. If the memory has been overwritten with new data, determine if the address of the updated memory location is stored in the tag RAM. This is shown in block 502. Determining whether the address of the updated memory location is stored in the tag RAM can be achieved by sending the address of the updated memory location into an address comparator. An address comparator compares an address of the updated memory location with addresses retrieved from the tag RAM. If the address of the updated memory location is not stored in the tag RAM, go to block 501. If the address of the updated memory location is stored in the tag RAM, overwrite this address with a predefined invalid pattern to indicate that the corresponding cache line is invalid. This is shown in block 503.

Figure 6:
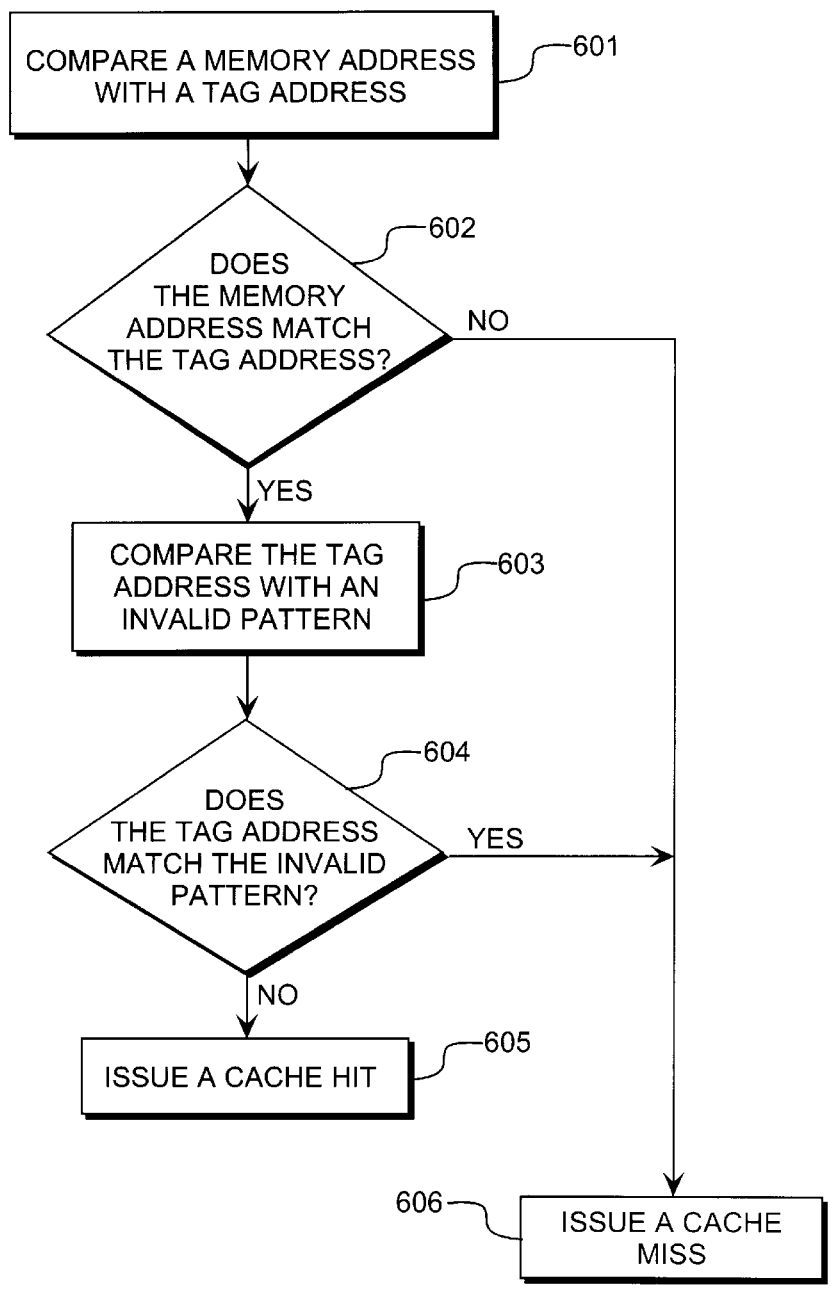
FIG. 6 is a flow chart illustrating a method for determining whether data stored in a cache memory location is valid.

FIG. 6 is a flow chart illustrating a method for determining whether data stored in a cache memory location is valid. First, compare a memory address with a tag address, as shown in block 601. The memory address may be a memory address requested by a processor. The tag address may be an address retrieved from a tag RAM. The comparison can be achieved by sending the memory address and the tag address to an address comparator such as that shown in FIG. 2. Next, determine whether the memory address matches the tag address. This is shown in block 602. If the memory address does not match the tag address, go to block 606. If the memory address matches the tag address, compare the tag address with a predefined invalid pattern. This is shown in block 603. The comparison can be achieved by sending the tag address and the invalid pattern to an invalid pattern comparator such as that shown in FIG. 2. Next, determine whether the tag address matches the invalid pattern, as shown in block 604. If the tag address does matches the invalid pattern, go to block 606. If the tag address does not match the invalid pattern issue a cache hit signal. This is shown in block 605. Block 606 instructs the routine to issue a cache miss signal.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be limiting. Therefore, references to details of particular embodiments are not intended to limit the scope of the claims, which in themselves recite only those features regarded as essential to the invention.

What is claimed is:

1. A cache controller for controlling a cache memory, comprising:

an address comparator unit that compares an address to be accessed with a N-bit tag address;

an invalid pattern comparator, coupled to the address comparator, that compares the N-bit tag address with an N-bit invalid pattern, the N-bit invalid pattern being used to indicate that data stored in the cache memory at a particular location is invalid; and a qualifier unit, coupled to the address comparator and the invalid pattern comparator, that outputs a hit/valid signal when the address to be accessed matches the N-bit tag address, and the tag address does not match the N-bit invalid pattern.

2. The cache controller of claim 1, wherein the address comparator unit comprises:

a plurality of XOR gates, wherein each of the plurality of XOR gates compares one bit of the address to be accessed with one bit of the N-bit tag address; and a NOR gate coupled to outputs of the plurality of XOR gates that outputs a hit signal when all bits of the address to be accessed match all bits of the N-bit tag address.

3. The cache controller of claim 1, wherein the invalid pattern comparator comprises:

a plurality of XOR gates, wherein each of the plurality of XOR gates compares a different bit of the N-bit tag address with a corresponding bit of the N-bit invalid pattern; and an OR gate coupled to outputs of the plurality of XOR gates that outputs a valid signal when the N-bit tag address does not match the N-bit invalid pattern.

4. The cache controller of claim 1, wherein the qualifier unit comprises an AND gate that outputs the hit/valid signal, the AND gate having respective inputs coupled to receive the hit and valid signals.

5. A computer system, comprising:

a bus;

a processor coupled to the bus;

a display device controller coupled to the bus;

external memory coupled to the bus;

cache memory coupled to the bus; and a cache controller, coupled to the bus and the cache memory, the cache controller including:

an address comparator unit that compares an address to be accessed with a N-bit tag address;

an invalid pattern comparator, coupled to the address comparator that compares the N-bit tag address with an N-bit invalid pattern, the N-bit invalid pattern being used to indicate that data stored in the cache memory at a particular location is invalid; and a qualifier unit, coupled to the address comparator and the invalid pattern comparator, that outputs a hit/valid signal when the address to be accessed matches the N-bit tag address, and the tag address does not match the N-bit invalid pattern.

6. The cache controller of claim 5, wherein the address comparator comprises:

a plurality of XOR gates, wherein each of the plurality of XOR gates compares one bit of the address to be accessed with one bit of the N-bit tag address; and a NOR gate coupled to outputs of the plurality of XOR gates that outputs a hit signal when all bits of the address to be accessed match all bits of the N-bit tag address.

7. The cache controller of claim 5, wherein the invalid pattern comparator comprises:

a plurality of XOR gates, wherein each of the plurality of XOR gates compares a different bit of the N-bit tag address with a corresponding bit of the N-bit invalid pattern; and an OR gate coupled to outputs of the plurality of XOR gates that outputs a valid signal when the N-bit tag address does not match the N-bit invalid pattern.

8. The cache controller of claim 5, wherein the qualifier unit comprises an AND gate that outputs the hit/valid signal, the AND gate having respective inputs coupled to receive the hit and valid signals.

\* \* \* \* \*